(No Model.) 2 Sheets—Sheet 1.

J. T. MILLER.
CASTER.

No. 299,828. Patented June 3, 1884.

WITNESSES:
Fred. G. Dieterich.
Wm. C. McGill Jr.

INVENTOR.
James T. Miller
by I. H. MacDonald
ATTORNEY (No Model.) 2 Sheets—Sheet 2.
J. T. MILLER.
CASTER.
No. 299,828. Patented June 3, 1884.
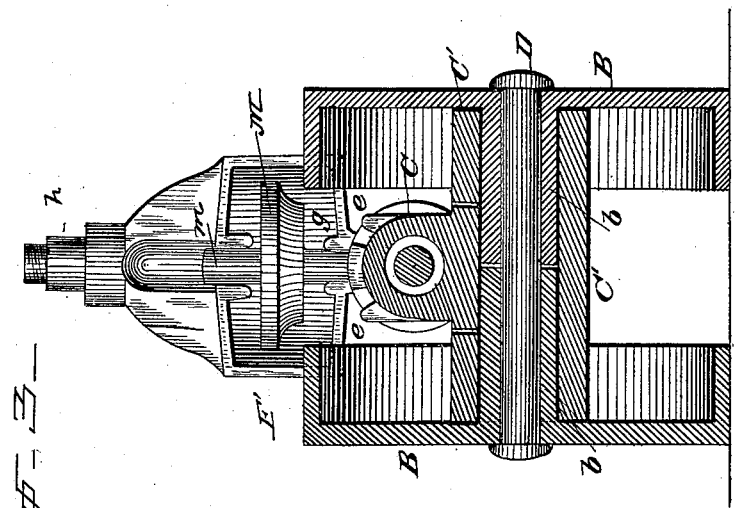
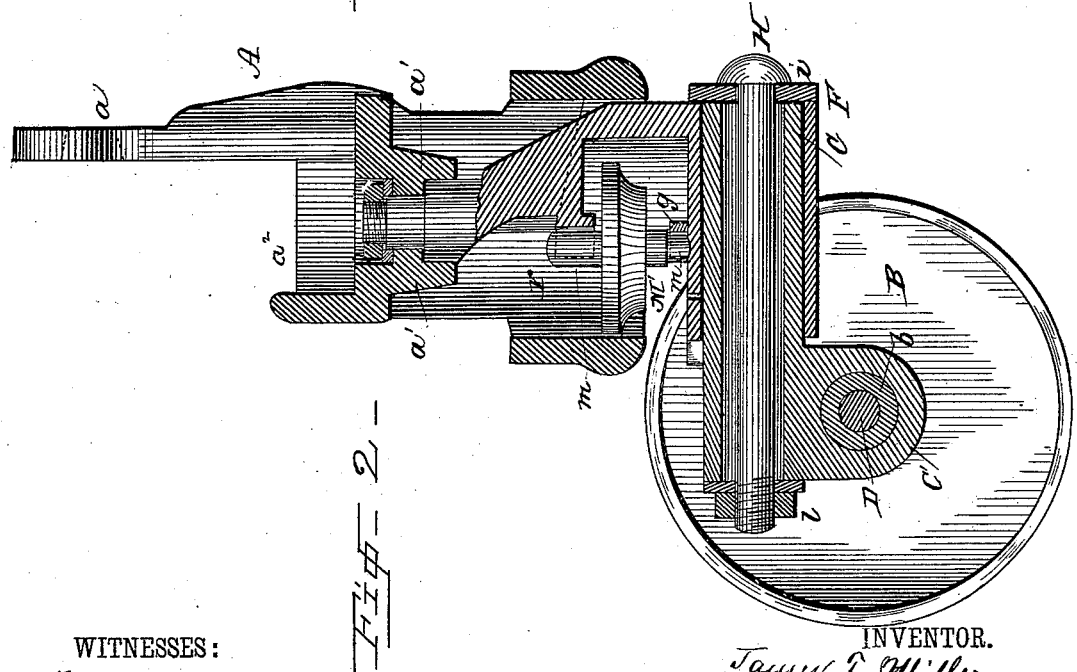
WITNESSES:
Fred. G. Dieterich.
Wm. C. McGill Jr.
INVENTOR.
James T. Miller
By I. N. MacDonald
ATTORNEY.

UNITED STATES PATENT OFFICE.

JAMES T. MILLER, OF URBANA, OHIO.

CASTER.

SPECIFICATION forming part of Letters Patent No. 299,828, dated June 3, 1884.

Application filed March 1, 1884. (No model.)

*To all whom it may concern:*

Be it known that I, JAMES T. MILLER, a citizen of the United States, residing at Urbana, in the county of Champaign and State of Ohio, have invented certain new and useful Improvements in Casters, of which the following is a specification, reference being had therein to the accompanying drawings.

My invention relates to an improved caster for trucks, such as store-trucks piano and baggage trucks, furniture, &c.

The object of the invention is to provide a form of truck-caster which is suitable not only for trucks and other heavy articles, but which at the same time is easily moved, and one in which the several elements turn or act among themselves easily and with reduced friction.

To this end it consists, essentially, of the several parts arranged and operating in the manner hereinafter set forth in the specification, and pointed out in the accompanying drawings, in which—

Figure 1:
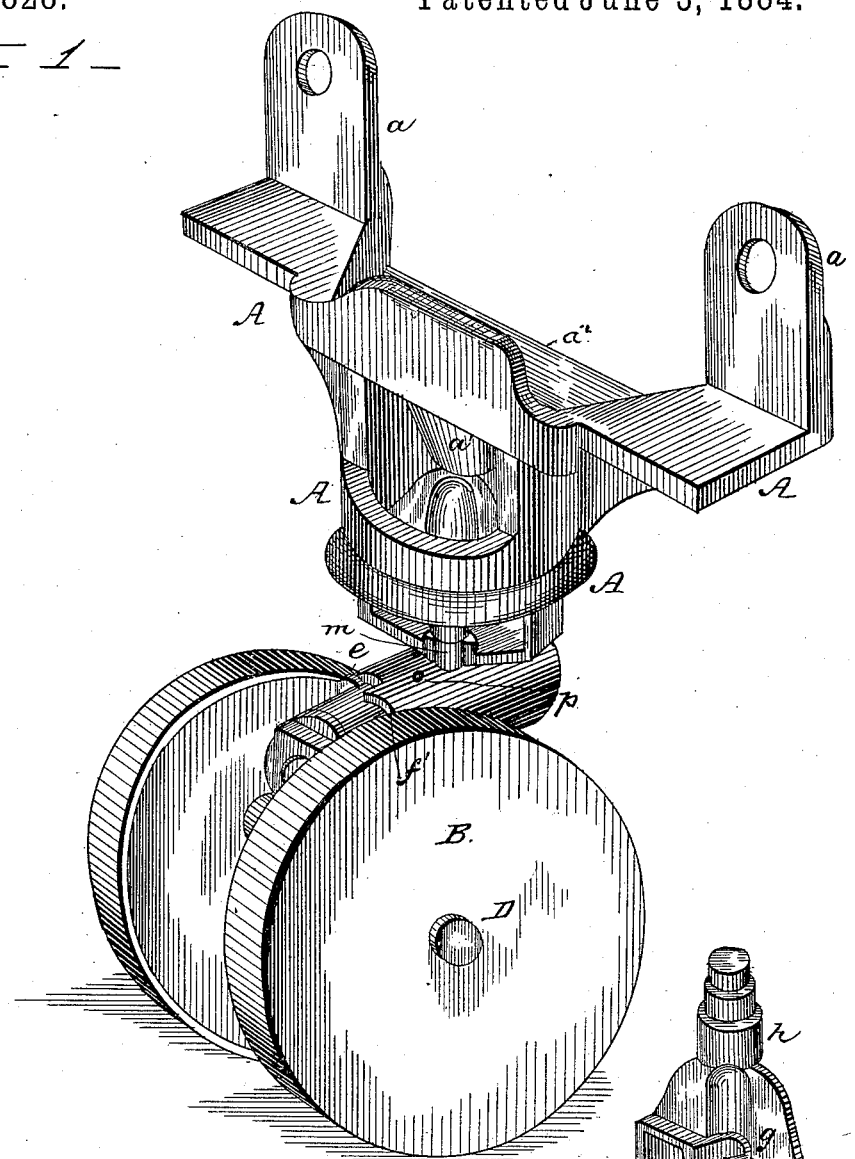
Figure 4:
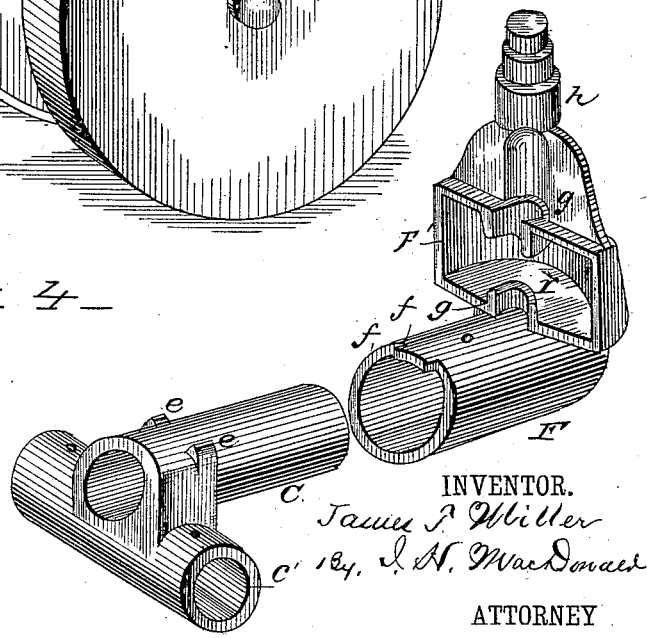

Figure 1 is a perspective view of my device; Figs. 2 and 3, sections of same, and Fig. 4 a detail perspective view of the cylinder-bearings.

Like letters of reference refer to like parts in the several figures.

Referring more particularly to the drawings, it will be observed that the caster consists of two wheels, B, journaled and provided with a frame-work, as hereinafter set forth. Each wheel is provided with a cylindrical bearing, $b$, journaled in a transverse cylinder, C', which is at the forward end of and integral with a longitudinal cylinder, C. The axle D passes through the bearings $b$, and is riveted or otherwise secured, so as to prevent it becoming detached. Each one of the bearings $b$ has an independent movement within the cylinder C' and about the axle D. The object of this is to enable the caster to be moved with least friction, and to be readily turned. In turning either forward or backward one wheel is free to move, while the other simply turns on its own ground. The cylinder F oscillates about the bearing C' within certain limits, determined by two lugs, $e$, on top and at each side of the cylinder C. These lugs come in contact with a shoulder or projection, $f$, at the front end of cylinder F. This horizontal cylinder F has a vertical frame or extension, F', provided with a roller-box, $r$, and two journal-boxes, $g$, for the trunnions or arbors of the roller M. This roller turns in a horizontal plane in the box $r$, the inner surface of the box forming a cavity and the track for the roller to travel on. The frame A has two perforated lugs, $a$, by means of which the caster is bolted or secured to the truck-frame or other article to be supported. The frame-seat or bed $a^2$ has a downwardly-projecting cone-shaped bearing, $a'$, for the screw-threaded end shank, $h$, of the frame F'. This frame is prevented from becoming detached by means of a nut screwed on the shank $h$. The wheels are not confined by a housing, as in the ordinary caster, and are made of any size and width of face desired. This not only insures reduction of friction, but steadiness of motion. The bearings $g$ are eccentric with and in rear of swiveled pivot $h$, thereby allowing a large roller to be used within a small space. It will also be noticed that by placing the journals of roller M in a different vertical plane from that of pivot-shank $h$ the weight is thrown down to the cylindrical bearings, and thence to the wheels, without falling on the bearings $g$ of the roller-trunnions. This is of great advantage, as it permits the roller to act just as a turn-table. In other forms of casters with housings for the wheels, horizontal rollers, and bent stems, the weight is taken off the rollers, and therefore friction is increased. In my device I use a straight stem, and therefore obviate the difficulties encountered by bent stems or shanks, which are apt to become broken, and by reason of being bent throw the weight in rear of the axle. Again, as the bearings $b$ of the caster-wheels B are eccentric with and in rear of the pivot-shank $h$, the bearings are brought against the rear face of cylinder C and the strain divided, thereby insuring greater strength and stability.

My improved caster is made of but few elements, care being taken to so construct and assemble them as to obtain strength with lightness and cheapness of construction. The several parts may be made large enough to support and move safes of heavy weight, or they may be light enough for furniture.

What I claim, and desire to secure by Letters Patent, is—

1. A two-wheeled caster in which the wheels are unconfined by housings, the bearings *b* of the wheels being independently mounted in the cylinder C', as and for the purpose set forth.

2. A caster the wheels of which are provided with independent bearings *b*, said bearings moving within a cylinder, C', through which and the bearings *b* the axle passes, as and for the purpose set forth.

3. In a caster, the combination, with the cylindrical bearing C, having a transverse cylinder, C', integral therewith, and stop-lugs *e e*, of the cylinder F, having the shoulder *f* at one end and a vertical frame and roller-box at the other end, substantially as and for the purpose set forth.

4. In a caster, the combination, with the oscillating cylinder F, having a vertical frame, F', provided with a roller-box and two vertical journal-boxes, of the frame A, having the bearing *a'* for the shank of frame F', the journal-boxes *g* being in rear of the pivot *h*, substantially as and for the purpose set forth.

5. In a caster, the combination, with the frame A and the vertical frame F', carrying the horizontal cylinder F, of the cylinder C, having the cylinder C' at right angles thereto, and the wheels having the bearings *b*, the cylinder C having a bearing in the cylinder F, and the wheels journaled in the cylinder C', substantially as and for the purpose set forth.

In testimony whereof I affix my signature in presence of two witnesses.

JAMES T. MILLER.

Witnesses:
  GEO. W. POLAND,
  W. W. HUGHES.